Dec. 10, 1935.　　　　J. H. JONES　　　　2,024,046

LUBRICATING APPARATUS

Filed June 6, 1934　　　3 Sheets-Sheet 1

Inventor

J. H. Jones

By Clarence A. O'Brien
Attorney

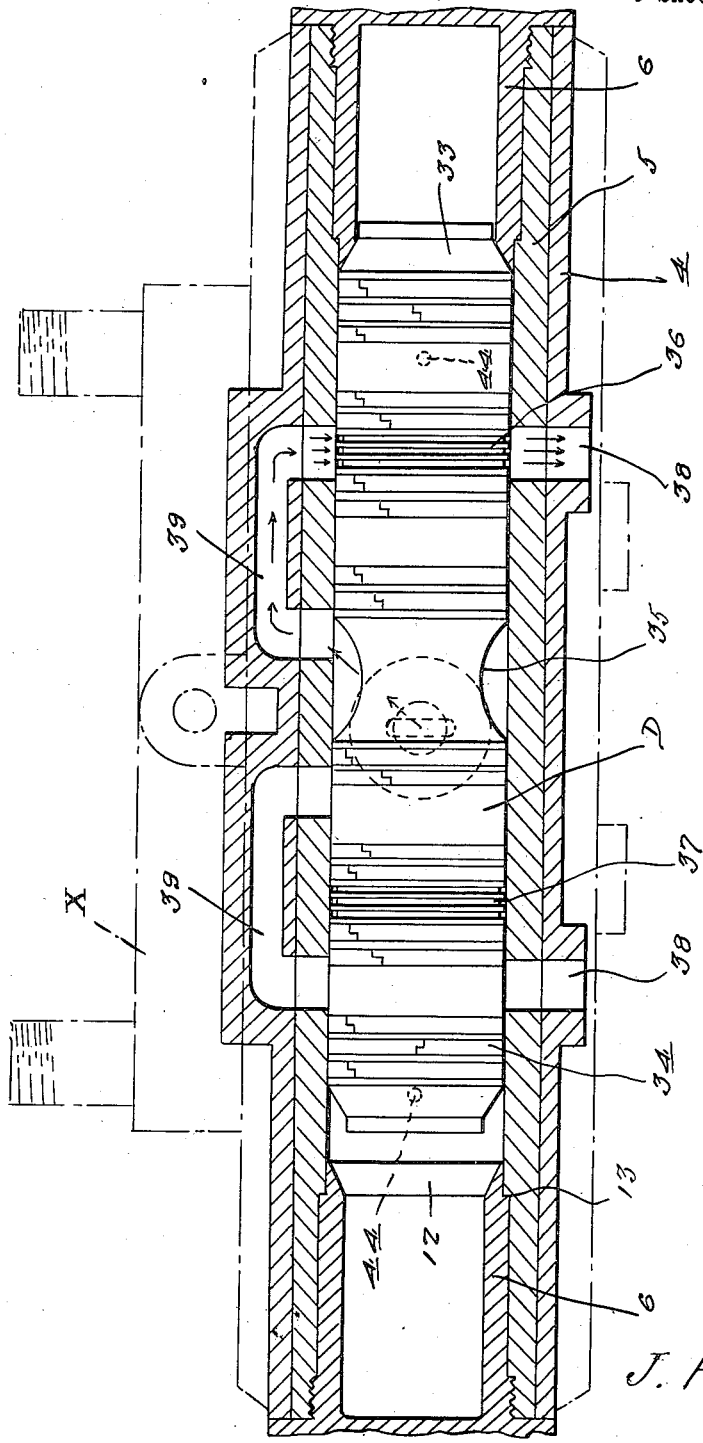

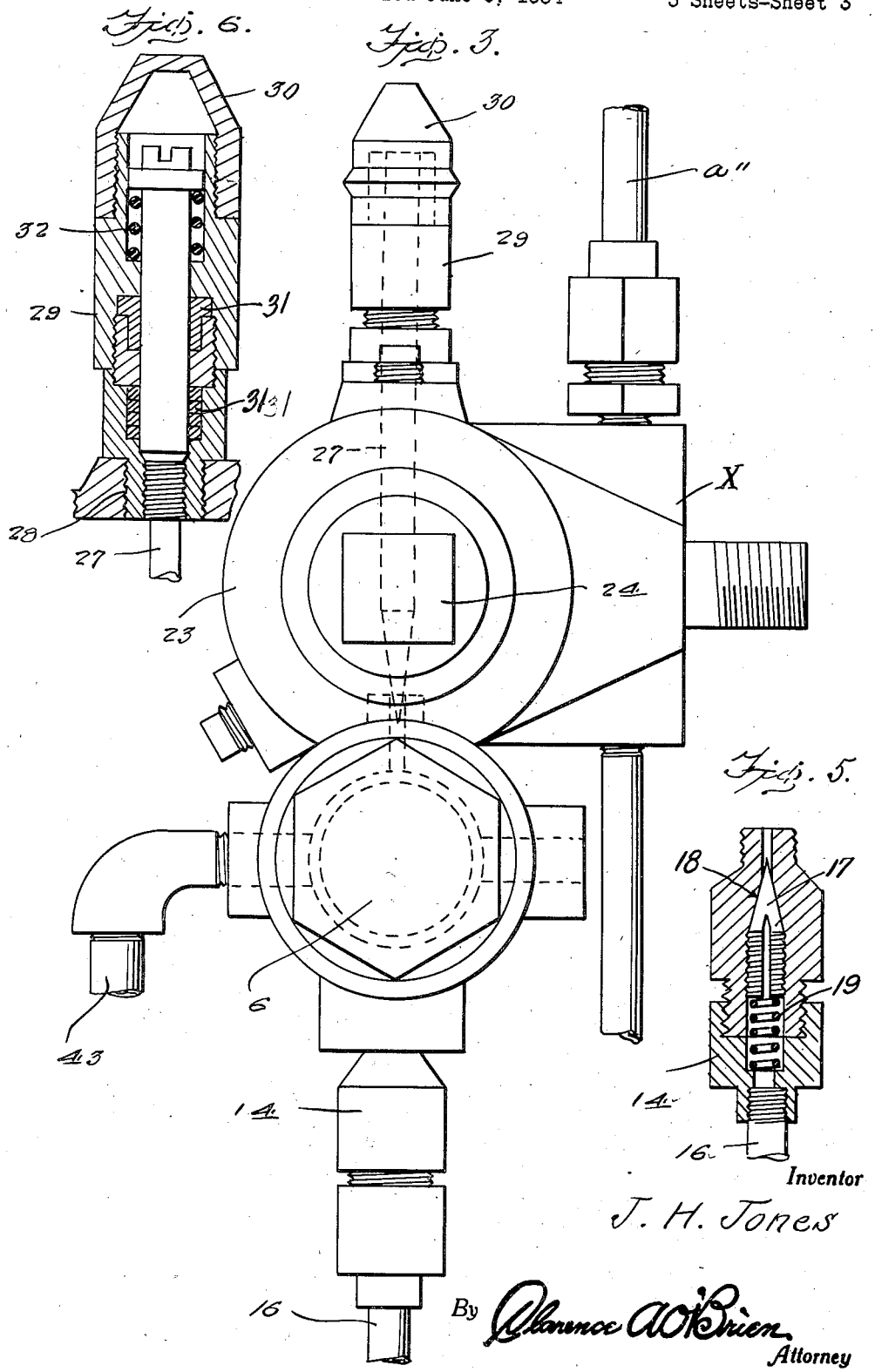

Patented Dec. 10, 1935

2,024,046

UNITED STATES PATENT OFFICE 2,024,046

LUBRICATING APPARATUS

Junius H. Jones, Atlanta, Ga.

Application June 6, 1934, Serial No. 729,308

7 Claims. (Cl. 184—55)

This invention relates to a lubricating apparatus, which may be used for lubricating the steam and air parts of an air pump, though which can also be used for lubricating other devices, the general object of the invention being to provide a cylinder containing a piston provided with oil receiving grooves, reservoirs having adjustable means for supplying the grooves with oil and fluid pressure means for reciprocating the piston from oil receiving position to oil discharging position and vice versa, with means for leading the oil to the parts to be lubricated.

Another object of the invention is to provide means for supplying the reservoirs with fluid under pressure to force the oil therefrom.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a section on line 2—2 of Figure 1.

Figure 3 is an end view of the invention.

Figure 5 is a section on line 5—5 of Figure 1.

Figure 6 is a section on line 6—6 of Figure 1.

Figure 4:
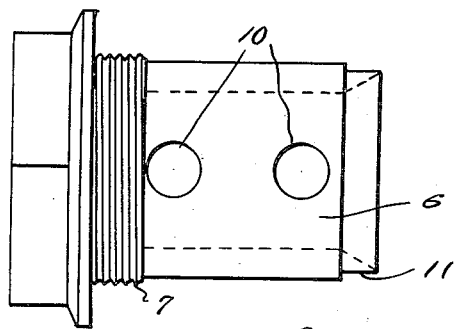
Figure 4 is a view of one of the closure members for the cylinder.
Figure 1:
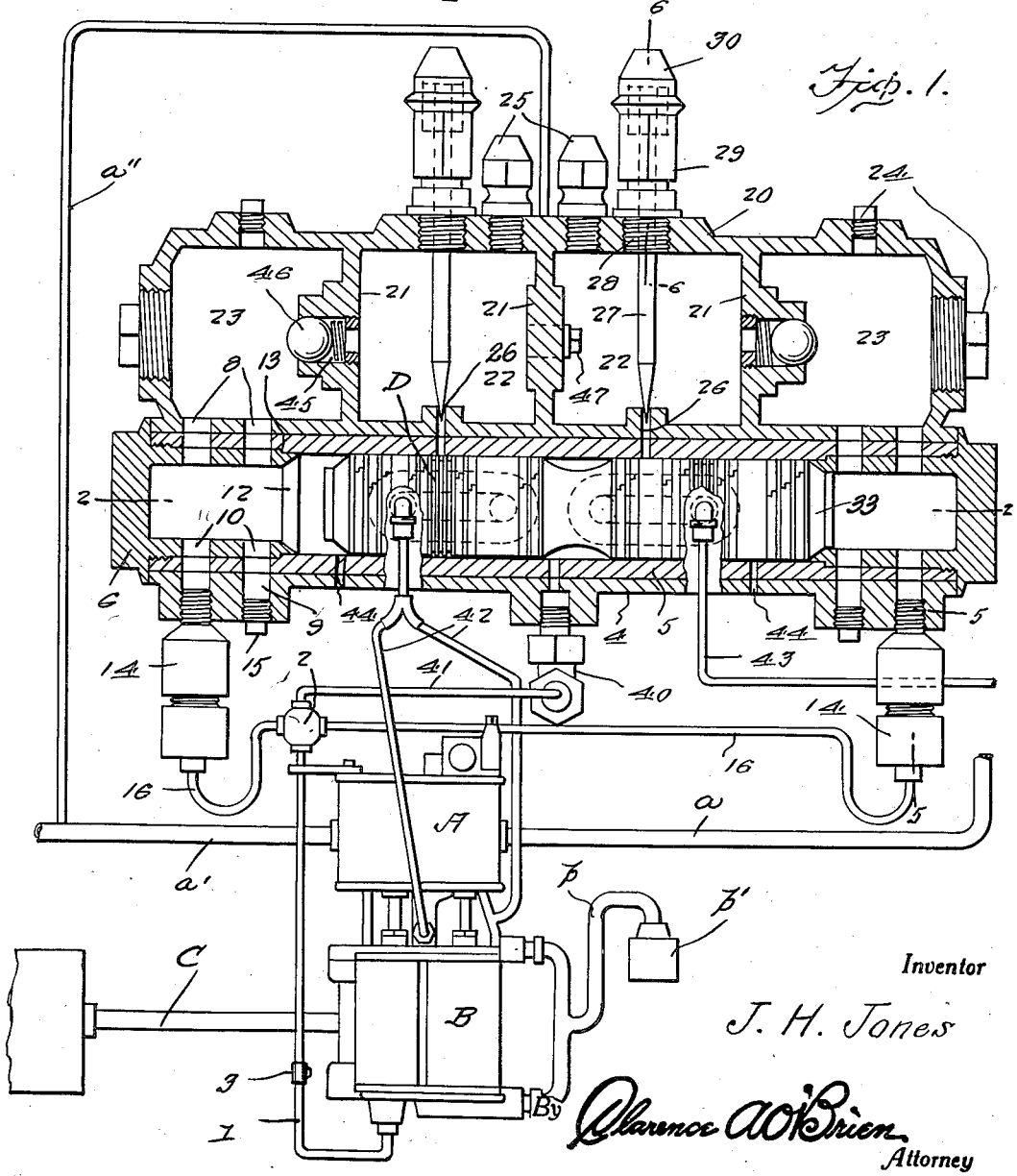
Figure 1 is a view partly in section and partly in elevation, showing the invention in use, as supplying oil to the steam and air parts of a compound air pump.

In these drawings, the letter A indicates the steam portion of the pump and the letter B the air part thereof, steam being supplied to the part A through the pipe $a$ and discharging from the part A through the pipe $a'$, while air is drawn into the air part B through the pipe connection $b$ provided with the screening $b'$ and the air discharging from the part B through the pipe C. A pipe 1 leads from the lower end of one of the cylinders of the air part B into a chamber forming member 2 and this pipe contains a check valve 3. The cylinder is shown at 4 and contains a lining 5 and both ends of the cylinder and lining are open and a pair of closure members 6 closes these ends. Each closure members 6 is of tubular construction, with its outer end forming a cap and of a shape to receive a wrench, each member having a threaded part 7 thereon for engaging the internal threads in the ends of the lining. Adjacent the ends of the cylinder and lining are the pairs of upper and lower ports 8 and 9 and the tubular part of each closure member 6 is formed with registering ports 10. The inner end of each member 6 is reduced, as shown at 11, and the inner part of this reduced end is flared, as shown at 12. The shoulder formed by the reduced part engages a shoulder in the lining, as shown in Figures 1 and 2 at 13. A governor valve casing 14 has its upper end screwed in each of the outer ports 9 and the inner port 9 is closed by a plug 15. The lower end of each casing 14 is connected by a pipe 16 with the air chamber 2 and each casing 14 contains the grooved plug 17 having a kerf in one end so that it can be adjusted toward and away from the seat 18 formed in a part of the casing and said plug is held in adjusted position by the spring 19 which is held compressed when the parts of the casing 14 are placed together, as shown in Figure 5. Thus by adjusting the plug, the amount of fluid passing through the casing 14 into the cylinder can be regulated. These valves time the movement of the piston, as desired.

A housing 20 is formed on or connected with the top part of the cylinder and is divided by the partitions 21 into the two oil reservoirs 22 and the two pressure chambers 23, each pair of ports 8 communicating with a pressure chamber, as shown. Each pressure chamber has openings therein closed by the plugs 24 and oil is supplied to the reservoirs 22 through openings closed by the plugs 25. Ports 26 leads from the reservoirs through the top part of the cylinder and lining and each port is controlled by a needle valve 27 which has a threaded part 28 threaded in an opening in the reservoir, with the upper part of the stem of the valve passing through a casing 29 provided with a cap 30, with packing means 31 in the casing for preventing leakage from the reservoir, the upper end of the stem having a kerf therein so that it can be turned by a screw driver or the like to adjust the valve with relation to the port to control the amount of oil passing from the reservoir into the cylinder. A spring 32 holds the valve stem in adjusted position.

A piston D reciprocates in the lining of the cylinder and has each end beveled, as shown at 33, for engaging the flaring inner end of each member 6, and said piston is provided with the usual rings 34 and it is also provided with the large groove 35 and sets of small grooves 36 and 37 which receive the oil from the ports 26 when the grooves are located under the ports. The oil from each set of grooves is discharged through a port 38 and a by-pass 39 is provided for each set of grooves and is formed in the walls of the cylinder, the discharge end of each by-pass being located opposite a discharge port 38 and the inlet of each by-pass is so located that when the grooves are in discharging position, the large groove 35 is in communication with the by-pass, as shown in Figure 2, and fluid under pressure is supplied to the large groove through means of the connection 40 and pipe 41 which is connected with the chamber forming member 2. Thus the oil is forced from the grooves by fluid under pressure and as will be seen from Figure 2, when the groove 35 is in communication with one by-pass, it is out of communication with the other by-pass, and it will also be seen in Figures 1 and 2, that when one set of grooves is receiving oil from a port 26, as at the left of Figures 1 and 2, the other set of grooves is in discharging position.

Figure 1 shows pipes 42 for leading the oil from the left hand discharge port 38 to different parts of the pump B, while a pipe 43 connects the right hand discharge port 38 with parts of the steam delivery line a of the steam part A, the connection not being shown. A discharge port 44 is arranged in each end part of the cylinder and its lining and is uncovered by the end of the piston when the opposite end of the piston is engaging the beveled seat 12 and thus it will be seen that the fluid in each pressure chamber 23 will act to move the piston in one direction until the port 44 is uncovered, when the fluid in the chamber 23 will escape, and as the fluid is building up in the other pressure chamber 23, the pressure in this chamber will force the piston in an opposite direction and then this fluid will escape from the other port 44. Thus the piston is reciprocated and as before stated, by adjusting the plugs in the casings 14, the reciprocatory movement of the piston can be controlled or regulated.

The oil in the reservoirs 22 is held under pressure by some of the fluid in the pressure chambers 23 passing through the ports 45 in the end partitions 21 and escape of the pressure from a reservoir into a chamber 23, when the pressure in the chamber 23 is low, is prevented by a spring pressed valve 46 controlling each port 45. The two reservoirs can be placed in communication with each other when desired, by removing the plug 47 which closes an opening in the central partition 21.

Thus it will be seen that the compressed air from a part of the air pump B will pass through the ends of the cylinder into the compression chambers 23 and the flow of air can be controlled by the governor valves contained in the casings 14 and this compressed air will reciprocate the piston, the air pressure building up in one chamber 23 as the air in the other chamber 23 is passing through the port 44 at the other end of the piston. The oil in the reservoirs is held under pressure and the flow of oil through the ports 26 can be regulated by adjusting the valves 27. The oil will flow into one set of grooves 36 as the oil is being discharged from the other set of grooves 37 and the oil is discharged from each set of grooves by the air entering the large groove 35 and passing through a by-pass 39 and acting on the oil in the set of grooves which is in discharging position.

When desired, steam may be led from the exhaust pipe a' through the pipe a" to a jacket X surrounding the reservoirs so as to keep the oil thin.

With this device, the amount of oil fed to the parts to be lubricated can be regulated through the medium of the needle valves and the movement of the piston can be regulated through means of the governor valves in the casings 14 and by providing the chambers 23, a supply of compressed fluid is provided for operating the piston.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. A lubricator of the class described comprising a cylinder, an oil discharge pipe communicating therewith, a piston in the cylinder having an oil groove therein, an oil reservoir connected with the top of the cylinder for feeding oil to the groove when the piston is at one end of its stroke, said groove communicating with the discharge pipe when the piston is at the other end of its stroke, said cylinder having exhaust ports therein, one port being covered by the piston and the other port uncovered when the piston is at one end of its stroke and said other port being covered and the first port uncovered when the piston is at the other end of its stroke, and means for introducing compressed fluid into the ends of the cylinder to reciprocate the piston.

2. A lubricator of the class described comprising a cylinder, an oil discharge pipe communicating therewith, a piston in the cylinder having an oil groove therein, an oil reservoir connected with the top of the cylinder for feeding oil to the groove when the piston is at one end of its stroke, said groove communicating with the discharge pipe when the piston is at the other end of its stroke, fluid pressure chambers in communication with the ends of the cylinder, said cylinder having exhaust ports therein, one of which is covered by the piston and the other uncovered by the piston when the piston is at one end of its stroke and the first port is uncovered and the other port covered when the piston is at the other end of its stroke, and means for introducing compressed fluid into the chambers to reciprocate the piston.

3. A lubricator of the class described comprising a cylinder, an oil discharge pipe communicating therewith, a piston in the cylinder having an oil groove therein, an oil reservoir connected with the top of the cylinder for feeding oil to the groove when the piston is at one end of its stroke, said groove communicating with the discharge pipe when the piston is at the other end of its stroke, fluid pressure chambers in communication with the ends of said cylinder, said cylinder having exhaust ports therein, one of which is covered by the piston and the other uncovered by the piston when the piston is at one end of its stroke and the first port is uncovered and the other port covered when the piston is at the other end of its stroke, means for introducing compressed fluid into the chambers to reciprocate the piston, governor valves for regulating the amount of compressed fluid entering the chambers, and means for controlling the passage of oil from the reservoirs to the grooves.

4. A lubricator of the class comprising a cylinder, an oil discharge pipe communicating therewith, a piston in the cylinder having an oil groove therein, an oil reservoir connected with the top of the cylinder for feeding oil to the groove when the piston is at one end of its stroke, said groove communicating with the discharge pipe when the piston is at the other end of its stroke, fluid pressure chambers in communication with the ends of said cylinder, said cylinder having exhaust ports therein one of which is covered by the piston and the other uncovered by the piston when the piston is at one end of its stroke and the first port is uncovered and the other port covered when the piston is at the other end of its stroke, means for introducing compressed fluid into the chambers to reciprocate the piston, governor valves for regulating the amount of compressed fluid entering the chambers, means for controlling the passage of oil from the reservoirs to the grooves, and means for connecting the reservoir with a pressure chamber, such means including a check valve for preventing escape of the pressure from the reservoir back to the chamber.

5. A lubricator of the class described comprising a cylinder, a pair of pressure chambers in communication with the ends thereof, means for introducing compressed fluid into said chambers, a pair of discharge pipes communicating with the cylinder, a piston in the cylinder reciprocated by the compressed fluid and said cylinder having exhaust ports therein, one of which is covered by the piston and the other uncovered by the piston when the piston is at one end of the stroke and the first port is uncovered and the other port covered when the piston is at the other end of the stroke, said piston having a pair of oil grooves therein, a pair of oil reservoirs connected with the top of the cylinder for feeding oil to the grooves, one groove being in communication with a reservoir and the other groove in communication with a discharge pipe when the piston is at one end of its stroke and the first groove being in communication with a discharge pipe and the second groove being in communication with its reservoir when the piston is at the other end of its stroke, said piston having a large centrally arranged groove therein, means for introducing fluid under pressure into said large groove, and a pair of by-passes for connecting the said large groove with the oil groove which is in communication with a discharge pipe.

6. A lubricator of the class described comprising a cylinder having its ends open, tubular members closing the ends of said cylinder and having beveled inner ends forming seats, a piston in the cylinder having beveled ends for engaging the seats, a pair of exhaust ports in the cylinder spaced slightly inwardly from the seats and covered and uncovered by the reciprocatory motion of the piston, means for introducing fluid under pressure to the tubular members for reciprocating the piston, a discharge pipe connected with the cylinder, said piston having an oil groove therein, an oil reservoir connected with the top of the cylinder for feeding oil to the groove when the piston is at one end of its stroke, said groove communicating with the discharge pipe when the piston is at the other end of its stroke, and pressure means for forcing oil from the groove when the same is in communication with the discharge pipe.

7. A lubricator of the class described comprising a cylinder, a discharge pipe communicating therewith, a piston in the cylinder having an oil groove therein, an oil reservoir connected to the top of the cylinder and feeding oil to the groove when the piston is at one end of the stroke, said groove communicating with the discharge pipe when the piston is at the other end of the stroke, said cylinder having exhaust ports therein, one port being covered by the piston and the other port uncovered when the piston is at one end of the stroke, and said other port being covered and the first port uncovered when the piston is at the other end of its stroke, means for introducing compressed fluid into the ends of the cylinder, to reciprocate the piston, and pressure means for forcing oil from the grooves when the same is in communication with the discharge pipe.

JUNIUS H. JONES.